(12) United States Patent
Lai et al.

(10) Patent No.: US 11,860,525 B2
(45) Date of Patent: Jan. 2, 2024

(54) PROJECTOR AND PROJECTION SYSTEM

(71) Applicant: IVIEW DISPLAYS (SHENZHEN) COMPANY LTD., Shenzhen (CN)

(72) Inventors: Hongji Lai, Shenzhen (CN); Steve Yeung, Shenzhen (CN); Zhiqiang Gao, Shenzhen (CN); Yuan Zhao, Shenzhen (CN); Mingnei Ding, Shenzhen (CN)

(73) Assignee: IVIEW DISPLAYS (SHENZHEN) COMPANY LTD., Shenzhen (CN)

( * ) Notice: Subject to any disclaimer, the term of this patent is extended or adjusted under 35 U.S.C. 154(b) by 118 days.

(21) Appl. No.: 17/525,439

(22) Filed: Nov. 12, 2021

(65) Prior Publication Data
US 2022/0066308 A1    Mar. 3, 2022

Related U.S. Application Data

(63) Continuation of application No. PCT/CN2020/070312, filed on Jan. 3, 2020.

(30) Foreign Application Priority Data

Dec. 31, 2019  (CN) .......................... 201911415018.7

(51) Int. Cl.
*G03B 21/20*     (2006.01)
*G02F 1/13363*   (2006.01)
(Continued)

(52) U.S. Cl.
CPC ... *G03B 21/2073* (2013.01); *G02F 1/133526* (2013.01); *G02F 1/133638* (2021.01); *G03B 21/142* (2013.01); *G03B 21/2033* (2013.01)

(58) Field of Classification Search
CPC .............. G03B 21/2073; G03B 21/142; G03B 21/2033
(Continued)

(56) References Cited

U.S. PATENT DOCUMENTS

2010/0091247 A1    4/2010  Yamamoto
2011/0317395 A1   12/2011  Chang
(Continued)

FOREIGN PATENT DOCUMENTS

CN    102004321 A    4/2011
CN    102243424 A   11/2011
(Continued)

OTHER PUBLICATIONS

JP2018098343 (Year: 2023).*

*Primary Examiner* — Jerry L Brooks
(74) *Attorney, Agent, or Firm* — IPRO, PLLC; Na Xu

(57) ABSTRACT

Embodiments of the present disclosure provide a projector and a projection system. In the projector, a projection light source, a polarizing beam splitting prism, and a projection lens are disposed in a first direction, and the polarizing beam splitting prism is disposed between the projection light source and the projection lens; a polarized light converting component, the polarizing beam splitting prism, and an LCOS imaging chip are disposed in a second direction, and the polarizing beam splitting prism is disposed between the polarized light converting component and the LCOS imaging chip, wherein the second direction is perpendicular to the first direction.

16 Claims, 2 Drawing Sheets

(51) Int. Cl.
*G02F 1/1335* (2006.01)
*G03B 21/14* (2006.01)

(58) Field of Classification Search
USPC .......................................................... 353/20
See application file for complete search history.

(56) References Cited

U.S. PATENT DOCUMENTS

| | | |
|---|---|---|
| 2014/0002756 A1 | 1/2014 | Huang et al. |
| 2014/0055755 A1* | 2/2014 | Fan ........................ G03B 33/06 |
| | | 353/121 |
| 2014/0176818 A1 | 6/2014 | Watson et al. |
| 2018/0157057 A1 | 6/2018 | Gelberg et al. |
| 2018/0217394 A1* | 8/2018 | Watson ................ H04N 9/3167 |
| 2020/0348530 A1* | 11/2020 | Xiao .................. G02B 27/1066 |

FOREIGN PATENT DOCUMENTS

| | | | |
|---|---|---|---|
| CN | 105300273 A | 2/2016 | |
| CN | 208654519 U | 3/2019 | |
| CN | 109581794 A | 4/2019 | |
| CN | 10221511 A | 9/2019 | |
| JP | 2018098343 A * | 6/2018 | ......... H01L 27/1462 |

* cited by examiner

PROJECTOR AND PROJECTION SYSTEM

CROSS-REFERENCE TO RELATED APPLICATIONS

This application is a continuation-application of International (PCT) Patent Application No. PCT/CN2020/070312, filed on Jan. 3, 2020, which claims priority to Chinese Patent Application No. 201911415018.7, filed with the National Intellectual Property Administration of China on Dec. 31, 2019, and entitled "PROJECTOR AND PROJECTION SYSTEM", the entire contents of which are incorporated herein by reference.

TECHNICAL FIELD

Embodiments of the present disclosure relate to the technical field of projection and display, and in particular, relate to a projector and a projection system.

BACKGROUND

With the development of semiconductor technologies, portable electronic devices are prevailing, and users are imposing greater and greater demands on micro projectors. However, during practice of the present disclosure, the present inventors have found that, at present, a projector typically includes a projection light source, a polarizing beam splitting prism, an LCOS (Liquid Crystal on Silicon) imaging chip, and a projection lens. The projection light source and the polarizing beam splitting prism are disposed in a first direction, the LCOS imaging chip, the polarizing beam splitting prism, and the projection lens are disposed in a second direction, and the first direction is perpendicular to the second direction. In this case, the projection light source and the projection lens are perpendicularly arranged. Since the sizes of the projection light source and the projection lens are both large, in the case that the projection light source and the projection lens are perpendicularly arranged, a margin space is defined between the projection light source and the projection lens. As a result, a waste of space is caused; and the projector is caused to have a large size, and is inconvenient to carry.

SUMMARY

In an embodiment of the present disclosure, a projector is provided. The projector includes a projection light source, a polarizing beam splitting prism, a polarized light converting component, an LCOS imaging chip, and a projection lens. The projection light source, the polarizing beam splitting prism, and the projection lens are disposed in a first direction, and the polarizing beam splitting prism is disposed between the projection light source and the projection lens. The polarized beam converting component, the polarizing beam splitting prism, and the LCOS imaging chip are disposed in a second direction, and the polarizing beam splitting prism is disposed between the polarized light converting component and the LCOS imaging chip, wherein the second direction is perpendicular to the first direction. The projection light source is configured to emit an S-polarized light. The polarizing beam splitting prism is configured to reflect the S-polarized light emitted from the projection light source to the polarized light converting component. The polarized light converting component is configured to convert the S-polarized light reflected from the polarizing beam splitting prism to a P-polarized light, and emit the converted P-polarized light to the polarizing beam splitting prism. The polarizing beam splitting prism is further configured to transmit the P-polarized light emitted from the polarized light converting component to the LCOS imaging chip. The LCOS imaging chip is configured to modulate the P-polarized light transmitted from the polarizing beam splitting prism to an S-polarized light, and emit the modulated S-polarized light to the polarizing beam splitting prism. The polarizing beam splitting prism is further configured to reflect the S-polarized light emitted from the LCOS imaging chip to the projection lens.

In another embodiment of the present disclosure, a projection system is provided. The projection system includes a display device, and a projector. The display device is disposed on a light exit side of the projector, and configured to display projection content of the projector. The projector includes a projection light source, a polarizing beam splitting prism, a polarized light converting component, an LCOS imaging chip, and a projection lens. The projection light source, the polarizing beam splitting prism, and the projection lens are disposed in a first direction, and the polarizing beam splitting prism is disposed between the projection light source and the projection lens. The polarized beam converting component, the polarizing beam splitting prism, and the LCOS imaging chip are disposed in a second direction, and the polarizing beam splitting prism is disposed between the polarized light converting component and the LCOS imaging chip, wherein the second direction is perpendicular to the first direction. The projection light source is configured to emit an S-polarized light. The polarizing beam splitting prism is configured to reflect the S-polarized light emitted from the projection light source to the polarized light converting component. The polarized light converting component is configured to convert the S-polarized light reflected from the polarizing beam splitting prism to a P-polarized light, and emit the converted P-polarized light to the polarizing beam splitting prism. The polarizing beam splitting prism is further configured to transmit the P-polarized light emitted from the polarized light converting component to the LCOS imaging chip. The LCOS imaging chip is configured to modulate the P-polarized light transmitted from the polarizing beam splitting prism to an S-polarized light, and emit the modulated S-polarized light to the polarizing beam splitting prism. The polarizing beam splitting prism is further configured to reflect the S-polarized light emitted from the LCOS imaging chip to the projection lens.

BRIEF DESCRIPTION OF THE DRAWINGS

One or more embodiments are illustrated by way of example, and not by limitation, in the figures of the accompanying drawings, wherein components having the same reference numeral designations represent like components throughout. The drawings are not to scale, unless otherwise disclosed.

DETAILED DESCRIPTION

For clearer descriptions of the objectives, technical solutions, and advantages of the embodiments of the present disclosure, the following clearly and completely describes the technical solutions in the embodiments of the present disclosure with reference to the accompanying drawings in the embodiments of the present disclosure. Apparently, the described embodiments are merely a part rather than all of the embodiments of the present disclosure. Based on the embodiments of the present disclosure, all other embodiments derived by persons of ordinary skill in the art without any creative efforts shall fall within the protection scope of the present disclosure.

It should be noted that, when an element is defined as "being secured or fixed to" another element, the element may be directly positioned on the element or one or more centered elements may be present therebetween. When an element is defined as "being connected or coupled to" another element, the element may be directly connected or coupled to the element or one or more centered elements may be present therebetween. As used herein, the terms "vertical", "horizontal", "left", "right", and similar expressions are for illustration purposes.

In addition, technical features involved in various embodiments of the present application described hereinafter may be combined as long as these technical features are not in conflict.

Figure 1:
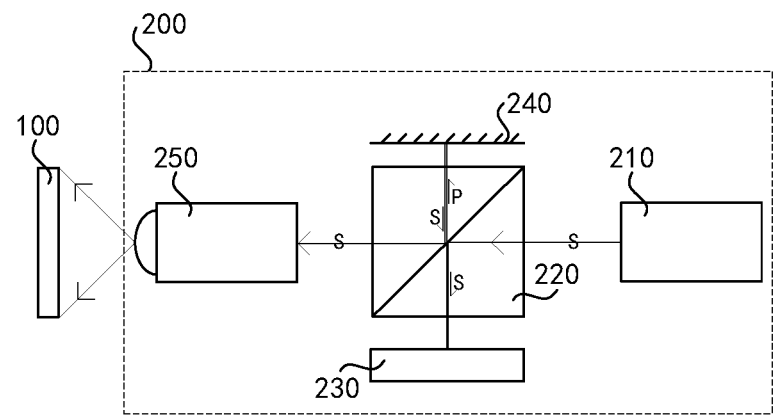
FIG. 1 is a schematic structural diagram of a projection system according to an embodiment of the present disclosure.

Referring to FIG. 1, a schematic structural diagram of a projection system according to an embodiment of the present disclosure is illustrated. The projection system includes: a display device 100 and a projector 200. The display device 100 is arranged on a light exit side of the projector 200, and is configured to display projection content of the projector 200.

The display device 100 is a projection screen. The projection screen may be a soft projection screen, or may be a hard projection screen.

The soft projection screen includes a reflective projection screen and a transmissive projection screen, and the hard projection screen includes a reflective projection screen.

In the case that the display screen is a reflective projection screen, the projector 200 is disposed in front of the projection screen, and projects images in a front projection fashion.

In the case that the projection screen is a transmissive projection screen, the projector 200 is disposed behind the projection screen, and projects images in a back projection fashion.

The projector 200 includes: a projection light source 210, a polarizing beam splitting prism 220, a polarized light converting component 230, an LCOS imaging chip 240, and a projection lens 250. The projection light source 210, the polarizing beam splitting prism 220, and the projection lens 250 are disposed in a first direction, and the polarizing beam splitting prism 220 is disposed between the projection light source 210 and the projection lens 250. The polarized light converting component 230, the polarizing beam splitting prism 220, and the LCOS imaging chip 240 are disposed in a second direction, and the polarizing beam splitting prism 220 is disposed between the polarized light converting component 230 and the LCOS imaging chip 240. The first direction is perpendicular to the second direction. For example, the first direction is a horizontal direction, and the second direction is a vertical direction. Nevertheless, in some embodiments, the first direction may also be a vertical direction, and the second direction may also be a horizontal direction.

It may be understood that in the case that the projection light source 210, the polarizing beam splitting prism 220, and the projection lens 250 are disposed in the first direction, optical axes of the projection light source 210, the polarizing beam splitting prism 220, and the projection lens 250 are parallel to the first direction; and in the case that the polarized light converting component 230, the polarizing beam splitting prism 220, and the LCOS imaging chip 240 are disposed in the second direction, optical axes of the polarized light converting component 230, the polarizing beam splitting prism 220, and the LCOS imaging chip 240 are parallel to the second direction.

In the projector 200, the projection light source 210 is configured to emit an S-polarized light; the polarizing beam splitting prism 220 is configured to reflect the S-polarized light emitted from the projection light source 210 to the polarized light converting component 230; the polarized light converting component 230 is configured to convert the S-polarized light reflected from the polarizing beam splitting prism 220 to a P-polarized light, and emit the converted P-polarized light to the polarizing beam splitting prism 220, such that the polarizing beam splitting prism 220 transmits the P-polarized light emitted from the polarized light converting component 230 to the LCOS imaging chip 240; and the LCOS imaging chip 240 is configured to modulate the P-polarized light transmitted from the polarizing beam splitting prism 220 to an S-polarized light, and emit the modulated S-polarized light to the polarizing beam splitting prism 220, such that the polarizing beam splitting prism 220 reflects the S-polarized light emitted from the LCOS imaging chip 240 to the projection lens 250.

It may be understood that the S-polarized light emitted from the projection light source 210 in the first direction is processed by the polarizing beam splitting prism 220, the polarized light converting component 230, and the LCOS imaging chip 240 and emitted to the projection lens 250 in the first direction, such that the projection lens 250 is arranged linearly with the projection light source 210. In addition, the polarized light converting component 230 and the LCOS imaging chip 240 both have a small size and thus do not occupy a large space in the second direction, such that the projector 200 is entirely in a straight line structure, and layout thereof is reasonable and compact. In this way, a waste of space is reduced, and the size of the projector 200 is reduced, such that the projector 200 is convenient to carry.

Figure 2:
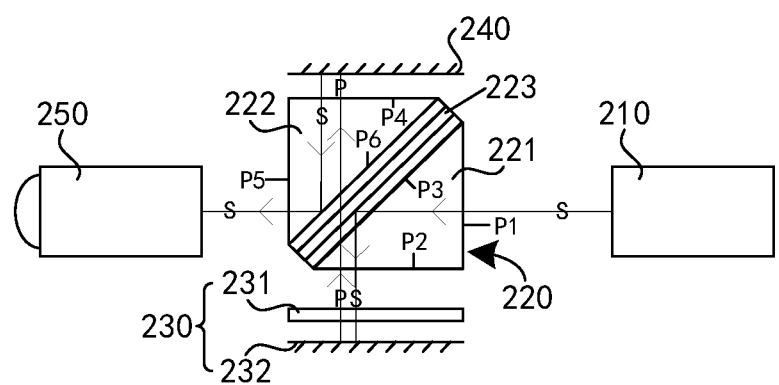
FIG. 2 is a schematic structural diagram of a projector according to an embodiment of the present disclosure.

For example, referring to FIG. 2, the projection light source 210 is a laser light source. The laser light source includes, but is not limited to, a YAG (Yttrium Aluminum Garnet) laser, an OPO (Optical Parametric Oscillator) laser, or the like. A laser beam emitted from the laser light source is an S-polarized light.

It may be understood that in some embodiments, the projection light source 210 may also be formed by a common light source and a polarizer. A light beam emitted from the common light source is converted by the polarizer to an S-polarized light and then emitted.

The polarizing beam splitting prism 220 includes: a first right-angled prism 221, a second right-angled prism 222, and a multi-layer birefringent polarizer 223.

The first right-angled prism 221 is a right-angled isosceles prism, and includes a first right-angled surface P1, a second right-angled surface P2, and a first beveled surface P3. The first right-angled surface P1, the second right-angled surface P2, and the first beveled surface P3 are all coated with an anti-reflection film to improve light transmittance of the first right-angled surface P1, the second right-angled surface P2, and the first beveled surface P3.

The second right-angled prism 222 is a right-angled isosceles prism, and includes a third right-angled surface P4, a fourth right-angled surface P5, and a second beveled surface P6. The third right-angled surface P4 and the fourth right-angled surface P5 are both coated with an anti-reflection film to improve light transmittance of the third right-angled surface P4 and the fourth right-angled surface P5. The second beveled surface P6 is coated with an anti-reflection film, wherein the anti-reflection film is capable of reflecting the S-polarized light and transmitting the P-polarized light.

The multi-layer birefringent polarizer 233 is a plate-shaped structure, and the multi-layer birefringent polarizer 233 is capable of reflecting the S-polarized light and transmitting the P-polarized light.

The first right-angled prism 221 and the second right-angled prism 222 define a cubic. The first beveled surface P3 is parallel to the second beveled surface P6, the first right-angled surface P1 faces towards the projection light source 210, the second right-angled surface P2 faces towards the polarized light converting component 230, the third right-angled surface P4 faces towards the LCOS imaging chip 240, and the fourth right-angled surface P5 faces towards the projection lens 250. The multi-layer birefringent polarizer 223 is disposed between the first beveled surface P3 and the second beveled surface P6, and is parallel to the first beveled surface P3 and the second beveled surface P6. The multi-layer birefringent polarizer 223, the first beveled surface P3, and the second beveled surface P6 each define a 45-degree or 135-degree included angle with the first direction. In this case, the first right-angled surface P1 and the fourth right-angled surface P5 are both perpendicular to the first direction, and the second right-angled surface P2 and the second right-angled surface P4 are both parallel to the first direction.

It may be understood that the S-polarized light emitted from the projection light source 210 is transmitted through the first right-angled surface P1 and the first beveled surface P3 to the multi-layer birefringent polarizer 223 and reflected by the multi-layer birefringent polarizer 223; the S-polarized light is then transmitted through the first beveled surface P3 and the second right-angled surface P2 to the polarized light converting component 230 and converted by the polarized light converting component to the P-polarized light; the P-polarized light is transmitted through the second right-angled surface P2, the first beveled surface P3, the multi-layer birefringent polarizer 223, the second beveled surface P6, and the third right-angled surface P4 to the LCOS imaging chip 240 and modulated by the LCOS imaging chip 240 to the S-polarized light; and the S-polarized light is transmitted through the third right-angled surface P4 to the second beveled surface P6 and reflected by the second beveled surface P6, and is then transmitted through the fourth right-angled surface P5 to the projection lens 250. The S-polarized light modulated by the LCOS imaging chip 240 is reflected by the second beveled surface P6, such that ghost phenomenon of the projector 200 is prevented.

Since the multi-layer birefringent polarizer 223, the first beveled surface P3, and the second beveled surface P6 each define a 45-degree or 135-degree included angle with the first direction, the S-polarized light emitted from the projection light source 210 is perpendicular to the S-polarized light reflected from the multi-layer birefringent polarizer 223. The S-polarized light reflected by the multi-layer birefringent polarizer 223 is parallel to the P-polarized light emitted from the polarized light converting component 230. The S-polarized light emitted from the LCOS imaging chip 240 is perpendicular to the S-polarized light reflected by the second beveled surface P6.

In an embodiment of the present disclosure, the multi-layer birefringent polarizer 223 is glued on the first beveled surface P3 and the second beveled surface P6, and in the case that the multi-layer birefringent polarizer 223 is glued on the first beveled surface P3 and the second beveled surface P6, the multi-layer birefringent polarizer 223 is totally coincident with the first beveled surface P3 and the second beveled surface P6.

Figure 3:
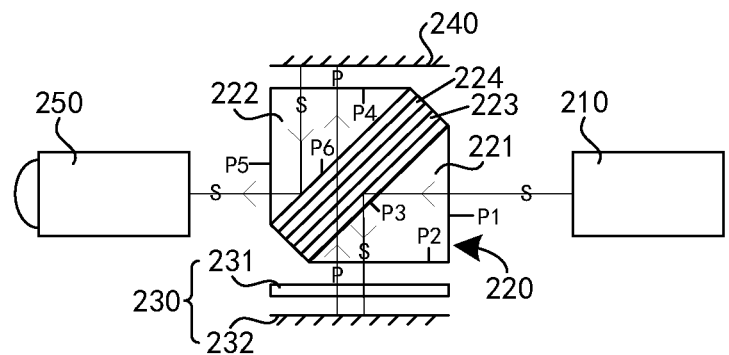
FIG. 3 is a schematic structural diagram of a projector according to an embodiment of the present disclosure.

Further, referring to FIG. 3, in some embodiments, the polarizing beam splitting prism 220 further includes: an S-polarized light absorptive polarizer 224.

The S-polarized light absorptive polarizer 224 is a plate-shaped structure, and is capable of absorbing the S-polarized light and transmitting the P-polarized light. In an embodiment of the present disclosure, the S-polarized light absorptive polarizer 224 is a metal wire-grid polarizer.

The S-polarized light absorptive polarizer 224 is disposed between the multi-layer birefringent polarizer 223 and the second beveled surface P6, and is parallel to the multi-layer birefringent polarizer 223 and the second beveled surface P6. In this case, the S-polarized light absorptive polarizer 224, the multi-layer birefringent polarizer 223, and the second beveled surface P6 each define a 45-degree or 135-degree included angle with the first direction.

It may be understood that the S-polarized light emitted from the projection light source 210 is transmitted through the first right-angled surface P1 and the first beveled surface P3 to the multi-layer birefringent polarizer 223 and reflected by the multi-layer birefringent polarizer 223; the S-polarized light is then transmitted through the first beveled surface P3 and the second right-angled surface P2 to the polarized light converting component 230 and converted by the polarized light converting component 230 to the P-polarized light; the P-polarized light is transmitted through the second right-angled surface P2, the first beveled surface P3, the multi-layer birefringent polarizer 223, the S-polarized light absorptive polarizer 224, the second beveled surface P6, and the third right-angled surface P4 to the LCOS imaging chip 240 and modulated by the LCOS imaging chip 240 to the S-polarized light; and the S-polarized light is transmitted through the third right-angled surface P4 to the second beveled surface P6 and reflected by the second beveled surface P6, and is then transmitted through the fourth right-angled surface P5 to the projection lens 250.

It may be understood that in the case that the S-polarized light absorptive polarizer 224 is disposed between the multi-layer birefringent polarizer 223 and the second beveled surface P6, even if the S-polarized light emitted from the projection light source 210 is transmitted from the multi-layer birefringent polarizer 223, the S-polarized light may also be absorbed by the S-polarized light absorptive polarizer 224 and thus fails to be transmitted to the projection lens 250, such that the projector 200 is effectively prevented from light leakage. In the meantime, even if the S-polarized light emitted from the LCOS imaging chip 240 is transmitted through the second beveled surface P6, the S-polarized light may also be absorbed by the S-polarized light absorptive polarizer 224 and thus fails to be transmitted to the multi-layer birefringent polarizer 223 and reflected twice by the multi-layer birefringent polarizer 223, such that the ghost phenomenon of the projector 200 is effectively prevented, and thus a good projection effect is achieved.

In an embodiment of the present disclosure, the S-polarized light absorptive polarizer 224, the multi-layer birefringent polarizer 223, the first right-angled prism 221, and the second right-angled prism 222 are connected by gluing. In this case, the S-polarized light absorptive polarizer 224, the multi-layer birefringent polarizer 223, the first beveled surface P3, and the second beveled surface P6 are completely coincident with each other.

The polarized light converting component 230 includes: a quarter-wave plate 231 and a reflective mirror 232.

The quarter-wave plate 231 is disposed between the reflective mirror 232 and the polarizing beam splitting prism 220, and is disposed on a light exit side of the reflective mirror 232. The quarter-wave plate 231 and the reflective mirror 232 are both parallel to the first direction, and are coaxially arranged.

The quarter-wave plate 231 is configured to rotate a polarization state of the S-polarized light reflected from the polarizing beam splitting prism by 45 degrees to acquire an intermediate light, and emit the intermediate light to the reflective mirror 232. The reflective mirror 232 is configured to reflect the intermediate light emitted from the quarter-wave plate 231 to the quarter-wave plate 231, such that the quarter-wave plate 231 rotates a polarization state of the intermediate light reflected from the reflective mirror 232 by 45 degrees to acquire a P-polarized light, and emits the P-polarized light to the polarizing beam splitting prism 220.

The s-polarized light modulated by the LCOS imaging chip 240 is a projection beam. In the case that the projection beam is incident to the projection lens 250, the projection lens 250 is capable of projecting the projection beam to the display device 100 to display projection content.

Figure 4:
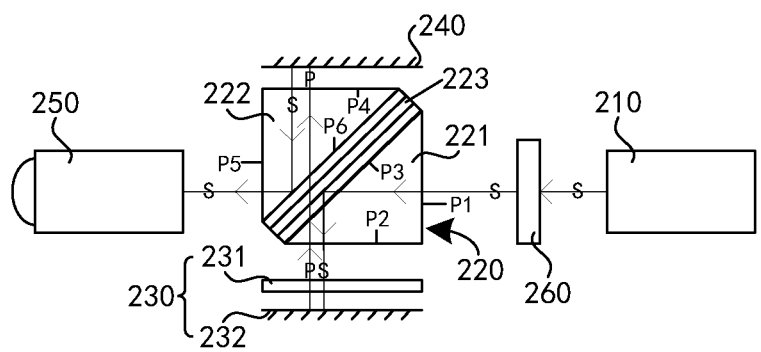
FIG. 4 is a schematic structural diagram of a projector according to an embodiment of the present disclosure.
Figure 5:
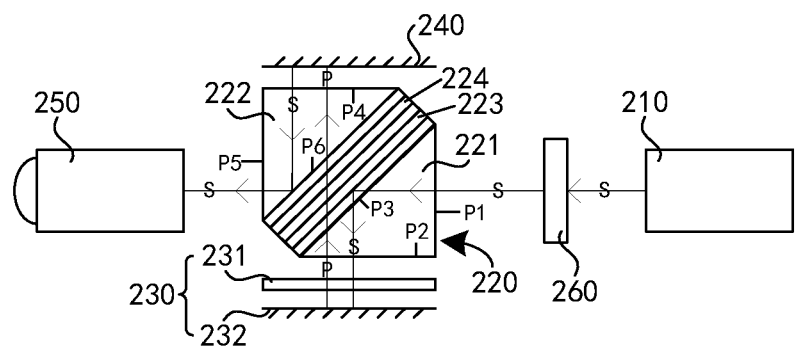
FIG. 5 is a schematic structural diagram of a projector according to an embodiment of the present disclosure.

Further, referring to FIG. 4 and FIG. 5, in some embodiments, for luminance uniformity of the projector 200, the projector 200 further includes: a microlens array 260.

The microlens array 260 is disposed between the projection light source 210 and the polarizing beam splitting prism 220, and is parallel to the second direction. The microlens array 260 and the projection light source 210 are coaxially arranged.

The microlens array 260 is a plate-shaped structure. In the case that the microlens array 260 is parallel to the second direction, a thickness direction of the microlens array 260 is coincident with the first direction.

A plurality of protrusions are disposed on a light exit surface of the microlens array 260. The microlens array 260 is capable of uniformizing the S-polarized light emitted from the projection light source 210 by the plurality of protrusions, and emitting the uniformized S-polarized light to the polarizing beam splitting prism 220.

The embodiments of the present disclosure achieve the following beneficial effects: Different from the related art, the embodiments of the present disclosure provide a projector and a projection system. The projector includes a projection light source, a polarizing beam splitting prism, a polarized light converting component, an LCOS imaging chip, and a projection lens. The projection light source, the polarizing beam splitting prism, and the projection lens are disposed in a first direction, and the polarizing beam splitting prism is disposed between the projection light source and the projection lens. The polarized light converting component, the polarizing beam splitting prism, and the LCOS imaging chip are disposed in a second direction, and the polarizing beam splitting prism is disposed between the polarized light converting component and the LCOS imaging chip, wherein the first direction is perpendicular to the second direction. The projection light source is configured to emit an S-polarized light. The polarized beam splitting prism is configured to reflect the S-polarized light emitted from the projection light source to the polarized light converting component. The polarized light converting component is configured to convert the S-polarized light reflected from the polarizing beam splitting prism to a P-polarized light and emit the P-polarized light to the polarizing beam splitting prism, such that the polarized beam splitting prism transmits the P-polarized light emitted from the polarized light converting component to the LCOS imaging chip. The LCOS imaging chip is configured to modulate the P-polarized light transmitted by the polarizing beam splitting prism to the S-polarized light and emit the S-polarized light to the polarizing beam splitting prism, such that the polarizing beam splitting prism reflects the S-polarized light emitted from the LCOS imaging chip to the projection lens. That is, the S-polarized light emitted from the projection light source in the first direction is processed by the polarizing beam splitting prism, the polarized light converting component, and the LCOS imaging chip, and emitted to the projection lens in the first direction, such that the projection lens is linearly arranged with the projection light source. Further, the LCOS imaging chip and the polarized light converting component are both small in size, such that layout thereof is reasonable and compact. In this way, a waste of space is reduced, and the size of the projector is reduced, such that the projector is convenient to carry.

It should be noted that the specification and drawings of the present disclosure illustrate preferred embodiments of the present disclosure. However, the present disclosure may be implemented in different manners, and is not limited to the embodiments described in the specification. The embodiments described are not intended to limit the present disclosure, but are directed to rendering a thorough and comprehensive understanding of the disclosure of the present disclosure. In addition, the above described technical feature may incorporate and combine with each other to derive various embodiments not illustrated in the above specification, and such derived embodiments shall all be deemed as falling within the scope of the specification of the present disclosure. Further, a person skilled in the art may make improvements or variations according to the above description, and such improvements or variations shall all fall within the protection scope as defined by the claims of the present disclosure.

The invention claimed is:

1. A projector, comprising a projection light source, a polarizing beam splitting prism, a polarized light converting component, an LCOS imaging chip, and a projection lens; wherein the projection light source, the polarizing beam splitting prism, and the projection lens are disposed in a first direction, and the polarizing beam splitting prism is disposed between the projection light source and the projection lens;

the polarized beam converting component, the polarizing beam splitting prism, and the LCOS imaging chip are disposed in a second direction, and the polarizing beam splitting prism is disposed between the polarized light converting component and the LCOS imaging chip, wherein the second direction is perpendicular to the first direction;

the projection light source is configured to emit an S-polarized light;

the polarizing beam splitting prism is configured to reflect the S-polarized light emitted from the projection light source to the polarized light converting component;

the polarized light converting component is configured to convert the S-polarized light reflected from the polarizing beam splitting prism to a P-polarized light, and emit the converted P-polarized light to the polarizing beam splitting prism;

the polarizing beam splitting prism is further configured to transmit the P-polarized light emitted from the polarized light converting component to the LCOS imaging chip;

the LCOS imaging chip is configured to modulate the P-polarized light transmitted from the polarizing beam splitting prism to an S-polarized light, and emit the modulated S-polarized light to the polarizing beam splitting prism; and the polarizing beam splitting prism is further configured to reflect the S-polarized light emitted from the LCOS imaging chip to the projection lens;

the polarizing beam splitting prism comprises a first right-angled prism, a second right-angled prism, and a multi-layer birefringent polarizer; wherein the first right-angled prism comprises a beveled surface, the second right-angled prism comprises a second beveled surface, and the first beveled surface is parallel to the second beveled surface, the multi-layer birefringent polarizer is disposed between the first beveled surface and the second beveled surface and is parallel to the first beveled surface and the second beveled surface, and the multi-layer birefringent polarizer;

the polarizing beam splitting prism further comprises an S-polarized light absorptive polarizer;

wherein the S-polarized light absorptive polarizer is disposed between the multi-layer birefringent polarizer and the second beveled surface, and is parallel to the multi-layer birefringent polarizer and the second beveled surface.

2. The projector according to claim 1, wherein
the first right-angled prism comprises a first right-angled surface and a second right-angled surface;

the second right-angled prism comprises a third right-angled surface and a fourth right-angled surface, wherein the second beveled surface is coated with a polarizer film;

the first right-angled prism and the second right-angled prism are defined to a cubic, the first right-angled surface faces towards the projection light source, the second right-angled surface faces towards the polarized light converting component, the third right-angled surface faces towards the LCOS imaging chip, and the fourth right-angled surface faces towards the projection lens; and the first beveled surface, and the second beveled surface each define an included angle of 45 degrees or 135 degrees with the first direction.

3. The projector according to claim 2, wherein the first right-angled prism and the second right-angled prism are both a right-angled isosceles prism.

4. The projector according to claim 2, wherein the multi-layer birefringent polarizer is glued on the first beveled surface and the second beveled surface.

5. The projector according to claim 1, wherein the S-polarized light absorptive polarizer is a metal wire-grid polarizer.

6. The projector according to claim 1, wherein the S-polarized light absorptive polarizer, the multi-layer birefringent polarizer, the first right-angled prism, and the second right-angled prism are connected by gluing.

7. The projector according to claim 1, wherein the polarized light converting component comprises a quarter-wave plate and a reflective mirror; wherein the quarter-wave plate is disposed between the reflective mirror and the polarizing beam splitting prism, and the quarter-wave plate and the reflective mirror are both parallel to the first direction;

the quarter-wave plate is configured to rotate a polarization state of the S-polarized light reflected from the polarizing beam splitting prism by 45 degrees to acquire an intermediate light, and emit the intermediate light to the reflective mirror;

the reflective mirror is configured to reflect the intermediate light emitted from the quarter-wave plate to the quarter-wave plate; and the quarter-wave plate is further configured to rotate a polarization state of the intermediate light reflected from the reflective mirror by 45 degrees to acquire a P-polarized light, and emit the P-polarized light to the polarizing beam splitting prism.

8. The projector according to claim 1, further comprising a microlens array; wherein the microlens array is disposed between the projection light source and the polarizing beam splitting prism, and is parallel to the second direction; and the microlens array is configured to uniformize the S-polarized light emitted from the projection light source, and emit the uniformized S-polarized light to the polarizing beam splitting prism.

9. A projection system, comprising:
a display device; and
a projector;
wherein the display device is disposed on a light exit side of the projector, and configured to display projection content of the projector; and the projector comprises a projection light source, a polarizing beam splitting prism, a polarized light converting component, an LCOS imaging chip, and a projection lens; wherein the projection light source, the polarizing beam splitting prism, and the projection lens are disposed in a first direction, and the polarizing beam splitting prism is disposed between the projection light source and the projection lens;

the polarized beam converting component, the polarizing beam splitting prism, and the LCOS imaging chip are disposed in a second direction, and the polarizing beam splitting prism is disposed between the polarized light converting component and the LCOS imaging chip, wherein the second direction is perpendicular to the first direction;

the projection light source is configured to emit an S-polarized light;

the polarizing beam splitting prism is configured to reflect the S-polarized light emitted from the projection light source to the polarized light converting component;

the polarized light converting component is configured to convert the S-polarized light reflected from the polarizing beam splitting prism to a P-polarized light, and emit the converted P-polarized light to the polarizing beam splitting prism;

the polarizing beam splitting prism is further configured to transmit the P-polarized light emitted from the polarized light converting component to the LCOS imaging chip;

the LCOS imaging chip is configured to modulate the P-polarized light transmitted from the polarizing beam splitting prism to an S-polarized light, and emit the modulated S-polarized light to the polarizing beam splitting prism; and the polarizing beam splitting prism is further configured to reflect the S-polarized light emitted from the LCOS imaging chip to the projection lens;

the polarizing beam splitting prism comprises a first right-angled prism, a second right-angled prism, and a multi-layer birefringent polarizer; wherein the first right-angled prism comprises a beveled surface, the second right-angled prism comprises a second beveled surface, and the first beveled surface is parallel to the second beveled surface, the multi-layer birefringent polarizer is disposed between the first beveled surface and the second beveled surface and is parallel to the first beveled surface and the second beveled surface;

the polarizing beam splitting prism further comprises an S-polarized light absorptive polarizer;

wherein the S-polarized light absorptive polarizer is disposed between the multi-layer birefringent polarizer and the second beveled surface, and is parallel to the multi-layer birefringent polarizer and the second beveled surface.

10. The projection system according to claim 9, wherein the first right-angled prism comprises a first right-angled surface and a second right-angled surface;

the second right-angled prism comprises a third right-angled surface and a fourth right-angled surface, wherein the second beveled surface is coated with a polarizer film;

the first right-angled prism and the second right-angled prism are defined to a cubic, the first right-angled surface faces towards the projection light source, the second right-angled surface faces towards the polarized light converting component, the third right-angled surface faces towards the LCOS imaging chip, and the fourth right-angled surface faces towards the projection lens; and the multi-layer birefringent polarizer, the first beveled surface, and the second beveled surface each define an included angle of 45 degrees or 135 degrees with the first direction.

11. The projection system according to claim 10, wherein the first right-angled prism and the second right-angled prism are both a right-angled isosceles prism.

12. The projection system according to claim 10, wherein the multi-layer birefringent polarizer is glued on the first beveled surface and the second beveled surface.

13. The projection system according to claim 9, wherein the S-polarized light absorptive polarizer is a metal wire-grid polarizer.

14. The projection system according to claim 9, wherein the S-polarized light absorptive polarizer, the multi-layer birefringent polarizer, the first right-angled prism, and the second right-angled prism are connected by gluing.

15. The projection system according to claim 9, wherein the polarized light converting component comprises a quarter-wave plate and a reflective mirror; wherein the quarter-wave plate is disposed between the reflective mirror and the polarizing beam splitting prism, and the quarter-wave plate and the reflective mirror are both parallel to the first direction;

the quarter-wave plate is configured to rotate a polarization state of the S-polarized light reflected from the polarizing beam splitting prism by 45 degrees to acquire an intermediate light, and emit the intermediate light to the reflective mirror;

the reflective mirror is configured to reflect the intermediate light emitted from the quarter-wave plate to the quarter-wave plate; and the quarter-wave plate is further configured to rotate a polarization state of the intermediate light reflected from the reflective mirror by 45 degrees to acquire a P-polarized light, and emit the P-polarized light to the polarizing beam splitting prism.

16. The projection system according to claim 9, further comprising a microlens array; wherein the microlens array is disposed between the projection light source and the polarizing beam splitting prism, and is parallel to the second direction; and the microlens array is configured to uniformize the S-polarized light emitted from the projection light source, and emit the uniformized S-polarized light to the polarizing beam splitting prism.

* * * * *